United States Patent
Yang et al.

(10) Patent No.: US 9,722,655 B2
(45) Date of Patent: Aug. 1, 2017

(54) SMART ULTRA BOX AND PROTECTIVE CASE WITH THE SAME

(71) Applicant: Mobileconn Technology Co.,LTD, New Taipei (TW)

(72) Inventors: Chung-Kai Yang, New Taipei (TW); Chin-Tien Lin, Taipei (TW)

(73) Assignee: MOBILECONN TECHNOLOGY CO.,LTD., New Taipei (TW)

( * ) Notice: Subject to any disclaimer, the term of this patent is extended or adjusted under 35 U.S.C. 154(b) by 0 days.

(21) Appl. No.: 15/041,169

(22) Filed: Feb. 11, 2016

(65) Prior Publication Data
US 2017/0005684 A1    Jan. 5, 2017

(30) Foreign Application Priority Data
Jul. 3, 2015  (TW) .............................. 104210776 A

(51) Int. Cl.
  *H04B 1/3888* (2015.01)
  *G06F 1/16* (2006.01)
  *G06F 1/18* (2006.01)

(52) U.S. Cl.
  CPC ......... *H04B 1/3888* (2013.01); *G06F 1/1628* (2013.01); *G06F 1/189* (2013.01)

(58) Field of Classification Search
  CPC ........ G06F 1/1628; G06F 1/189; G06F 1/263; H04B 1/3888
  See application file for complete search history.

(56) References Cited

U.S. PATENT DOCUMENTS

| | | | |
|---|---|---|---|
| 8,690,600 B1* | 4/2014 | Zeolla .................... | H01R 13/72 439/131 |
| 2015/0263777 A1* | 9/2015 | Fraden ................. | H04B 1/3888 455/575.8 |
| 2016/0277052 A1* | 9/2016 | Sadek ................. | H04M 1/0202 |

\* cited by examiner

*Primary Examiner* — Thai Vu
(74) *Attorney, Agent, or Firm* — Li & Cai Intellectual Property (USA) Office

(57) ABSTRACT

A smart ultra box adapting to a protective case is disclosed. The protective case protects a mobile communication device. The ultra box comprises a main body, a conversion unit and a flexible printed circuit board. The main body has a power output interface and an external power interface. The conversion unit disposes at the main body, to electrically connect the power output interface and the external power interface. The flexible printed circuit board electrically connects to the conversion unit, the flexible printed circuit board extending outwardly from the main body. The external power interface receives a commercial power source. The conversion unit converts the commercial power source into a first electric power and a second electric power. The power output interface output the first electric power, and the flexible printed circuit board transmits the second electric power.

8 Claims, 3 Drawing Sheets

SMART ULTRA BOX AND PROTECTIVE CASE WITH THE SAME

BACKGROUND

1. Technical Field

The present disclosure is related to a smart ultra box and protective case with the same. Especially, this present disclosure is suitable for a mobile communication device.

2. Description of Related Art

In today's market, a power bank usually includes a storage battery and control circuit board in a main body of the power bank, and configures at least a USB transmission interface on the main body. When charging, power stored at the storage battery can be converted by the control circuit board into the appropriate voltage and current. Then, the appropriate voltage and current are provided to a user's mobile device via the USB transmission interface. With the high market growth of smart phones, tablet computers and other mobile devices, and mobile devices developing toward big screen and multi-core, power consumption has increased significantly. In recent years, power bank demand has greatly grown to keep up with the development of simulated actions of the mobile devices.

However, whether smart phones or tablet computers, these operations typically require additional power supply transmission lines to transmit power; moreover, when the power of the battery has run down, this kind of power bank needs a power transformer charger to recharge. That is, users need to carry the power bank, the power supply transmission lines and the power transformer when going out, which is quite troublesome and inconvenient.

SUMMARY

The instant disclosure provides a smart ultra box and protective case with the same, which is used for supplying power to a mobile communication device through the power converter, or transmitting power from a flexible printed circuit board.

The instant disclosure provides a smart ultra box, adapted to a protective case, including a main body, a conversion unit and a flexible printed circuit board. The main body includes a power output interface and an external power interface. The conversion unit disposes on the main body, to electrically connect the power output interface and the external power interface. The flexible printed circuit board electrically connects to the conversion unit. The flexible printed circuit board extends outwardly from the main body. The external power interface receives a commercial power source. The conversion unit converts the commercial power source into a first electric power and a second electric power. The power output interface outputs the first electric power. And the flexible printed circuit board transmits the second electric power.

The instant disclosure provides a protective case, adapted to accommodate a mobile communication device, includes an accommodating portion, a bottom plate portion and a smart ultra box. The accommodating portion houses the mobile communication device. The bottom plate portion couples with the accommodating portion. The smart ultra box disposes on an outer side of the accommodating portion. And the flexible printed circuit board disposes on the bottom plate portion.

To sum up, the exemplary embodiments of the present disclosure provide a smart ultra box and a protective case thereof, for supplying power to a mobile communication device through the power converter, or transmitting power from a flexible printed circuit board. Wherein, the protective case means for housing the mobile communication device which is a smart phone to make the mobile communication device to get the best protection effect. This present disclosure really enhances the ease of operation, efficiency and quality of the smart ultra box and its protective case.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
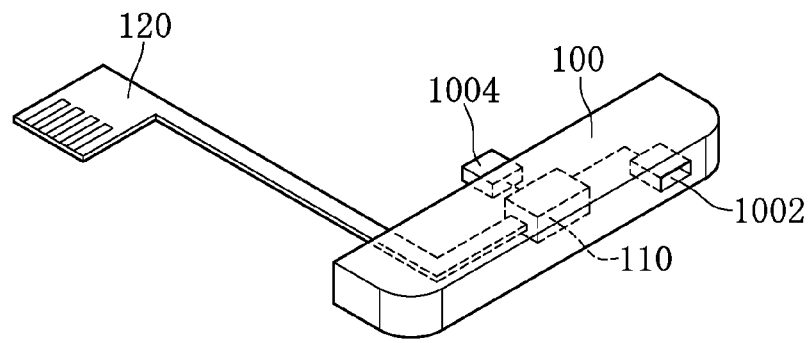
FIG. 1 is a schematic diagram of a smart ultra box according to an exemplary embodiment of the instant disclosure.

Example embodiments will be described below in more detail with reference to the accompanying drawings. Many different forms and embodiments are possible without deviating from the spirit and teachings of this disclosure and so the disclosure should not be construed as limited to the embodiments set forth herein. Rather, these embodiments are provided so that this disclosure will be thorough and complete, and will fully convey the scope of the disclosure to those skilled in the art. In the drawings, the sizes and relative sizes of layers and regions may be exaggerated for clarity. Like reference numbers refer to like elements throughout.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below and hence, a first element, component, region, layer or section may be termed as a second element, component, region, layer or section without departing from the teachings of the present disclosure. As used herein, the term "and/or" includes any and all combinations of one or more of the associated listed items.

The following is to describe a smart ultra box and protective case thereof via a plurality of embodiments with corresponding drawings. However, the embodiments below are not for restricting the scope of the instant disclosure.

Please refer to FIG. 1, which is a schematic diagram of a smart ultra box according to an exemplary embodiment of the instant disclosure. The smart ultra box 10 adapts to a protective case. The protective case is for protecting a mobile communication device. The smart ultra box 10 includes a main body 100, a conversion unit 110 and a flexible printed circuit board 120. Substantively, the protective case is such as a mobile phone protective case, a tablet computer protective case or other communication device protective case. For convenience of explanation, the present disclosure uses a mobile phone protective case to illustrate, but the present disclosure does not limit the protective case.

The smart ultra box 10 which is an ultra box electrically connects between a mobile communication device and an external power source. Wherein, the smart ultra box 10 is a platform used as an external power supply to the mobile communication device. In addition, the smart ultra box 10 transmits electric power via the flexible printed circuit board 120. The flexible printed circuit board 120 extends outwardly from the main body 100. The above disclosure is not intended to limit the smart ultra box 10 of the present invention.

The main body 100 includes a power output interface 1004 and an external power interface 1002. Substantively, the power output interface 1004 electrically connects a smart phone, and the external power interface 1002 electrically connects an external power source. The power output interface 1004 is a power connection port means for electrically connecting a charging hole or charging structure of the smart phone. The external power interface 1002 connects the power connection port to receive a commercial power source from the external power source. That is, the commercial power source enters to the conversion unit 110 via the external power interface 1002. And after the conversion unit 110 converts the commercial power source, the main body 100 outputs power to the smart phone via the power output interface 1004.

The conversion unit 110 disposes on the main body 100, to electrically connect the power output interface 1004 and the external power interface 1002. Substantively, the conversion unit 110 implements through an alternating current (AC) to direct current (DC) converting circuit, a direct current (DC) to direct current (DC) converting circuit and/or a combination of one or more thereof. The above disclosure is not intended to limit the conversion unit 110 of the present invention.

The flexible printed circuit board 120 electrically connects to the conversion unit. The flexible printed circuit board 120 extends outwardly from the main body 100. The external power interface 1002 receives a commercial power source. Then, the conversion unit 110 converts the commercial power source into a first electric power and a second electric power. The power output interface 1004 outputs the first electric power, and the flexible printed circuit board 120 transmits the second electric power.

The smart ultra box 10 receives a 110 volt alternating current (AC). A power adapter connects between the commercial power source and the external power interface 1002. Wherein, the power adapter has a circuit design which is an alternating current (AC) to direct current (DC) converting circuit. Thereby, the power adapter transmits a direct current power to the smart ultra box 10. Since the direct current power enters the ultra box 10 from the external power interface 1002, and the conversion unit 110 is a direct current (DC) to direct current (DC) converting circuit, the conversion unit 110 converts the direct current power into a first electric power in line with the electricity of the smart phone. Then, the power output interface 1004 outputs the first electric power to the smart phone. Additionally, the conversion unit 110 converts the direct current power into a second electric power in line with the electricity of a mobile power supply device. And the flexible printed circuit board 120 transmits the second electric power to the mobile power supply device.

In another embodiment of the instant disclosure, the power adapter does not have a circuit design which is an alternating current (AC) to direct current (DC) converting circuit. An alternating current power enters the ultra box 10 from the external power interface 1002, wherein, the conversion unit 110 is an alternating current (AC) to direct current (DC) converting circuit. The conversion unit 110 converts the alternating current power to a direct current power, and processes the direct current power using such as rectifiers, regulators and transformers, etc. Thence, the conversion unit 110 outputs the first electric power via the power output interface 1004, and transmits the second electric power via the flexible printed circuit board 120. The above disclosure is not intended to limit the smart ultra box 10 of the present invention.

In the following embodiments, only parts different from embodiments in FIG. 1 are described, and the omitted parts are indicated to be identical to the embodiments in FIG. 1. In addition, for an easy instruction, similar reference numbers or symbols refer to similar elements.

Figure 2:
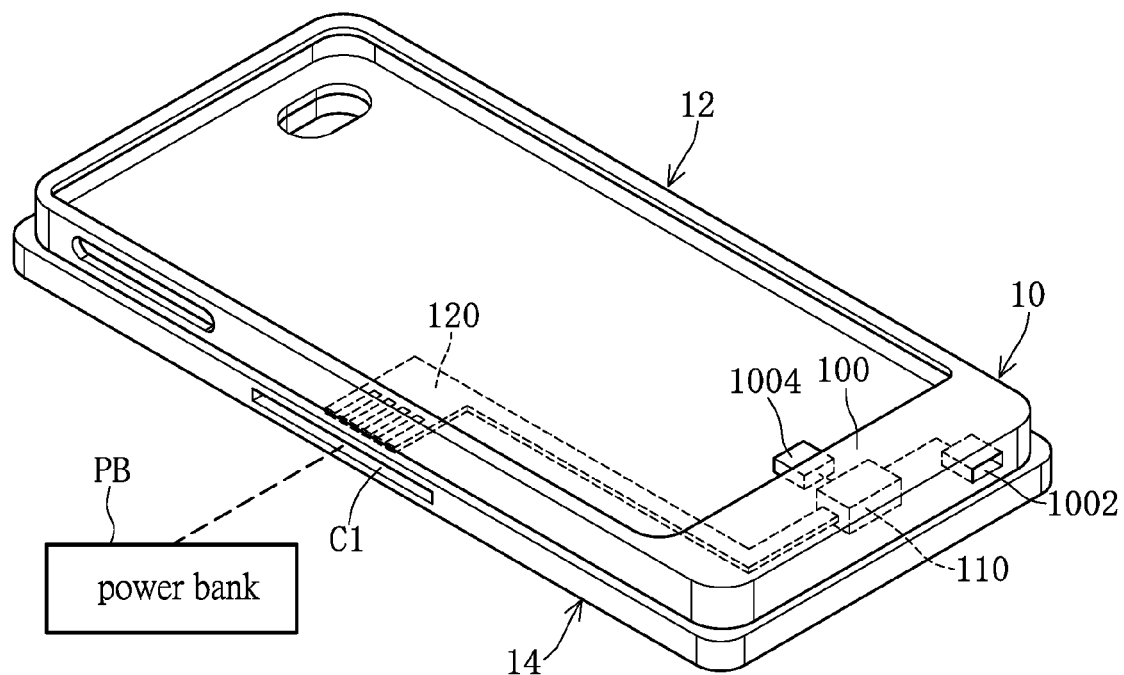
FIG. 2 is a schematic diagram of a protective case according to an exemplary embodiment of the instant disclosure.

FIG. 2 is a schematic diagram of a protective case according to an exemplary embodiment of the instant disclosure. As shown in FIG. 2, there is a protective case 1 adapted to accommodate a mobile communication device. Substantively, the protective case 1 of the present embodiment can be regarded as a mobile phone protective case. The mobile communication device is a smart phone, a tablet computer or a personal digital assistant (PDA). For convenience of explanation, the mobile communication device of the present disclosure uses a mobile phone to illustrate, but the present disclosure does not limit the mobile communication device.

The protective case 1 includes an accommodating portion 12, a bottom plate portion 14 and a smart ultra box 10. Substantively, the accommodating portion 12 houses the mobile communication device. The bottom plate portion 14 couples with the accommodating portion 12. And the bottom plate portion 14 is disposed on an outside and bottom of the accommodating portion 12. As shown in FIG. 2, the smart ultra box 10 disposes on an outer side of the accommodating portion 12. The main body 100 of the smart ultra box 10 and the accommodating portion 12 is an integrated design. The power output interface 1004 disposes on an inner side of the accommodating portion 12. And the external power interface 1002 disposes on the outer side of the accommodating portion 12. For convenience of explanation, the smart ultra box 10 of the present embodiment disposes on a lateral side of the lower rim of the accommodating portion 12. However, in other embodiments, the smart ultra box 10 can be disposed on a lateral side of the upper rim of the accommodating portion 12, or the smart ultra box 10 can be disposed on a longitudinal side of the accommodating portion 12.

The protective case 1 is a plastic protective case or other materials protective case for protecting a smart phone. The accommodating portion 12 houses the smart phone. Wherein the accommodating portion 12 configures a camera lens opening, a phone keypad opening, a charging opening, or other openings. Thus, all features and functions of the smart phone are completely usable through the openings of the accommodating portion 12. The above disclosure is not intended to limit the protective case 1 of the present invention. Furthermore, the protective case 1 has features such as anti-dust, anti-scratch, anti-bump and waterproofing, etc. For example, the protective case 1 keeps dust and debris out of the main openings, like the openings and connecting ports of the smart phone. Thereby, the protective case 1 avoids dust accumulation and cause damage to the openings and connecting ports of the smart phone.

The flexible printed circuit board 120 can be disposed on the bottom plate portion 14. The bottom plate portion 14 is an outer casing of the protective case 1. The flexible printed circuit board 120 extends to a connecting portion C1 from the outer casing. That is, a terminal of the flexible printed circuit board 120 electrically connects to the connecting portion C1. Substantively, the connecting portion C1 electrically connects to a power bank PB. The connecting portion C1 is a connective port electrically corresponding with the power bank PB. The connecting portion C1 electrically connects to the power bank PB via engaging, mating, magnetic snapping or otherwise. The above disclosure is not intended to limit the connecting portion C1 of the present invention.

In the following description further instruction is given teaching a working mechanism and a circuit structure of the protective case 1.

Figure 3:
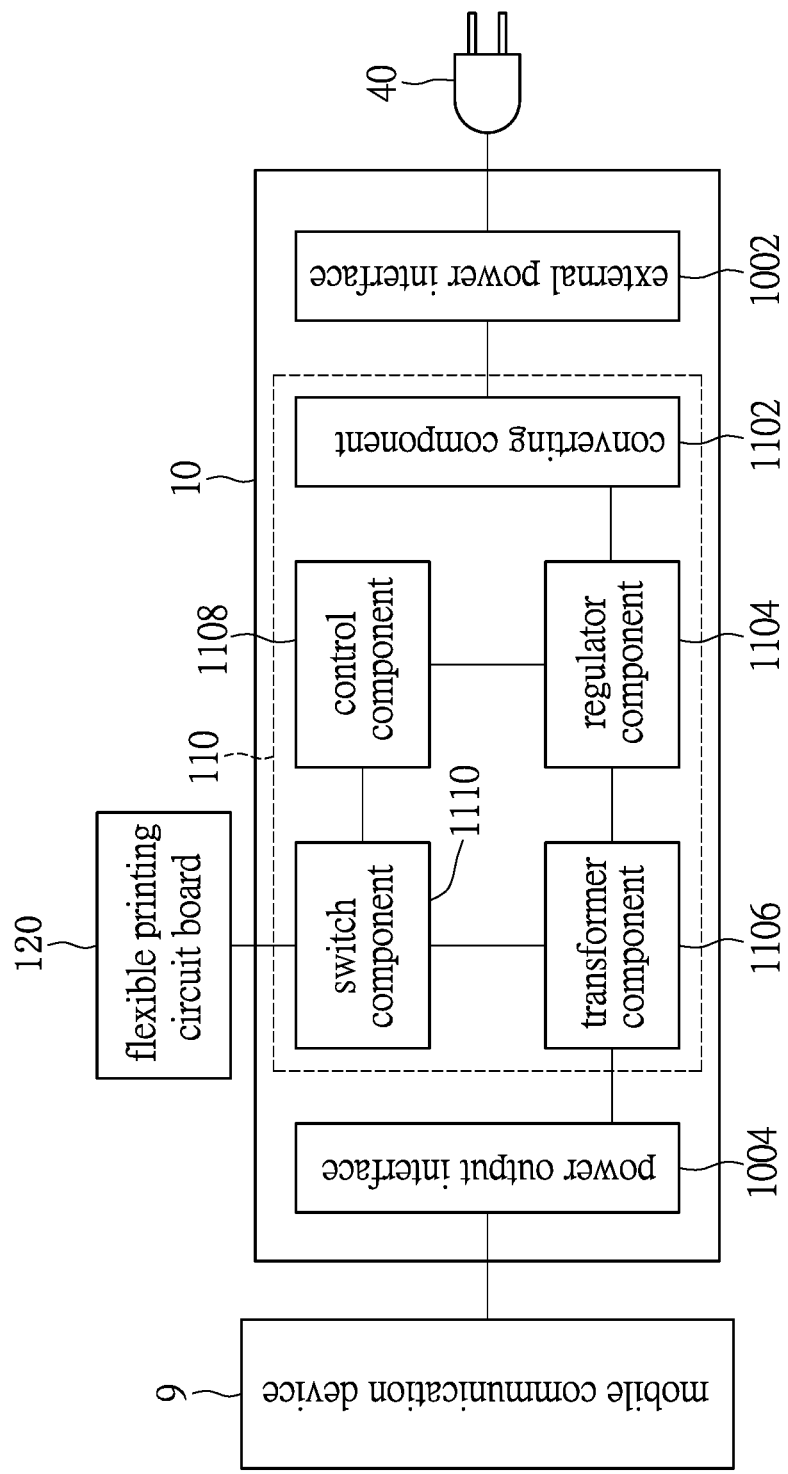
FIG. 3 is a functional block schematic diagram of a protective case according to another exemplary embodiment of the instant disclosure.

Referring to FIG. 3 concurrently, FIG. 3 shows a functional block schematic diagram of a protective case according to another exemplary embodiment of the instant disclosure. In the present embodiment, a conversion unit 110 includes a converting component 1102, a regulator component 1104, a transformer component 1106, a control component 1108 and a switch component 1110 which is electrically connected to the control component 1108. Substantively, the converting component 1102 is electrically connected to the external power interface 1002 and the regulator component 1104. The transformer component 1106 is electrically connected to the power output interface 1004 and the flexible printed circuit board 120. The switch component 1110 is electrically connected between the transformer component 1106 and the flexible printed circuit board 120. The control component 1108 is electrically connected to the regulator component 1104 or the transformer component 1106, and the control component 1108 is used for controlling the switch component 1110 switching on/off.

The control component 1108 implements through circuits of semiconductor electronic components, such as a control circuit, a processing circuit or an analyzing circuit. The above disclosure is not intended to limit the control component 1108 of the present invention. Wherein, a working power of the control component 1108 comes from the regulator component 1104. However, in other embodiments, the working power of the control component 1108 comes from the transformer component 1106. A person of ordinary skill in the art could design the control component 1108 freely.

Additionally, in the present embodiment, the smart ultra box 10 further includes a power adapter 40. The power adapter 40 connects between the commercial power source and the external power interface 1002. The power adapter 40 has an alternating current (AC) to direct current (DC) converting circuit. The converting component 1102 is a direct current (DC) to direct current (DC) converting circuit which is implemented through a boost circuit, a buck circuit, buck-boost circuit and/or a combination of one or more thereof. The regulator component 1104 is a voltage regulator circuit or a filter circuit. The transformer component 1106 is a voltage transformer circuit. In other embodiments, the converting component 1102 is an alternating current (AC) to direct current (DC) converting circuit, and converts an alternating current power to a direct current power. The above disclosure is not intended to limit the converting component 1102, the regulator component 1104 and the transformer component 1106 of the present invention.

The conversion unit 110 further includes a protective component which is implemented through an over-charge protective circuit, an over-current protective circuit, an over-voltage protective circuit and/or a combination of one or more thereof. The above disclosure is not intended to limit the protective component of the present invention.

When the protective case 1 has been electrically connected to an external power source such as a commercial power source, the external power source enters the conversion unit 110 via the power adapter 40 and the external power interface 1002. Wherein, the conversion unit 110 converts the alternating current power to a direct current power. After the regulator component 1104 regulates the direct current power, the direct current power is transmitted to the transformer component 1106. Then, the direct current power outputs to a smart phone via the power output interface 1004. In addition, the direct current power outputs to a power bank via the connecting portion C1.

In the present embodiment, the commercial power source can charge a smart phone and a power bank. After the power bank is fully charged, the control component 1108 switches the switch component 1110 to an off state. Thereby, the external power source stops to charging the power bank. In addition, there is a switch component configured between the transformer component 1106 and the power output interface 1004. Thus, the control component 1108 can control a supply circuit, between the transformer component 1106 and a mobile communication device 9, switching it on/off.

Figure 4:
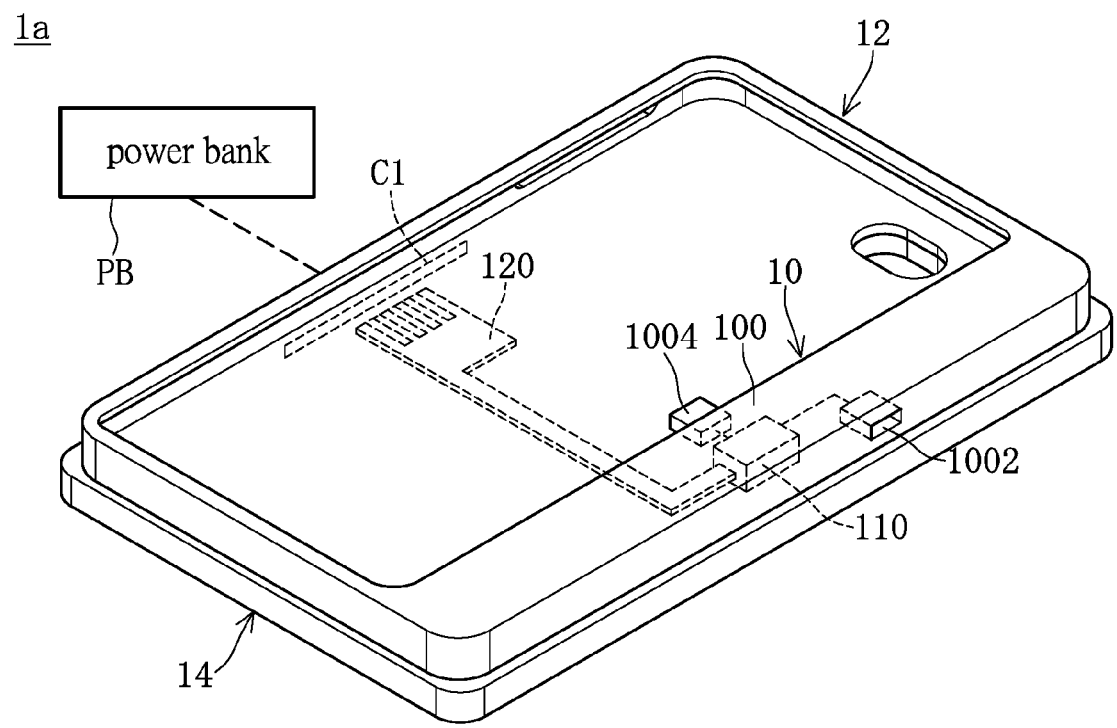
FIG. 4 is a schematic diagram of a protective case according to another exemplary embodiment of the instant disclosure.

Referring to FIG. 4 concurrently, FIG. 4 shows a schematic diagram of a protective case according to another exemplary embodiment of the instant disclosure. The protective case 1a of the present embodiment is similar to the protective case 1 of the above-mentioned embodiment in FIG. 2. However, there are differences between the protective case 1 and the protective case 1a. That is, a smart ultra box 10a of the present embodiment disposes in a longitudinal side of the accommodating portion 12. The smart ultra box 10a configures a position of a power output interface 1004 according to a position of a charging opening of the smart phone, to make the power output interface 1004 connect to the charging output of the smart phone. A position of an external power interface 1002 is designed depending on requirements of users operating the smart phone.

The flexible printed circuit board 120 extends from a longitudinal side of the accommodating portion 12 to a corresponding longitudinal side of the accommodating portion 12. In the other embodiments, the flexible printed circuit board 120 extends to a connecting portion C1 according to a position of the connecting portion C1. The above disclosure is not intended to limit the extending direction and length of the flexible printed circuit board 120 of the present invention. It is worth to mention that the protective case 1a may also not include the bottom plate portion 14 in another embodiment of the instant disclosure. And the connecting portion C1 is disposed on an outer side of the accommodating portion 12. The above disclosure is not intended to limit the protective case 1a of the present invention. Except for the above differences, relevant details of the operations for the smart ultra box and protective case thereof are described in the embodiments of FIGS. 1-3, and thus not repeated here.

To sum up, the instant disclosure provides a smart ultra box for supplying power to a mobile communication device through a power converter, or transmitting power from a flexible printed circuit board, wherein, a conversion unit electrically connects to a power output interface, an external power interface and the flexible printed circuit board. The conversion unit outputs a first electric power and a second electric power via a direct current (DC) to direct current (DC) converting circuit or an alternating current (AC) to direct current (DC) converting circuit. The first electric power is transmitted by the power output interface. The second electric power is transmitted by the flexible printed circuit board. When a user uses a protective case of the present disclosure, the smart phone housing in the protective case can be charged directly through an external power supply. On the other hand, the protective case means for housing the mobile communication device, which can be a smart phone, is used to make the mobile communication device get the best protection effect. That is, the smart ultra box and the protective case thereof is a mobile phone protective case with an integrated design. As a result, the present disclosure really enhances the ease of operation, efficiency and quality of the smart ultra box and its protective case.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A smart ultra box, adapted to a protective case protecting a mobile communication device, the ultra box comprising:
    a main body, having a power output interface and an external power interface;
    a conversion unit, disposed on the main body, to electrically connect the power output interface and the external power interface; and
    a flexible printed circuit board, electrically connected to the conversion unit, the flexible printed circuit board extending outwardly from the main body;
    wherein, the external power interface receives a commercial power source, the conversion unit converts the commercial power source into a first electric power and a second electric power, the power output interface outputs the first electric power, and the flexible printed circuit board transmits the second electric power;
    wherein the conversion unit comprises a converting component, a regulator component and a transformer component, said converting component is electrically connected to the external power interface and said regulator component, and said transformer component is electrically connected to the power output interface and the flexible printed circuit board;
    wherein the conversion unit further comprises a control component and a switch component which is electrically connected to the control component, the switch component is electrically connected between the transformer component and the flexible printed circuit board, the control component is electrically connected to the regulator component or the transformer component, and the control component controlling the switch component switching on/off; and
    wherein the mobile device is charged via the power output interface and a power bank is charged via the flexible printed circuit board and wherein when the power bank is fully charged the control component controls the switch component to switch off the power to the flexible printed circuit board.

2. The smart ultra box according to claim 1, further comprising a power adapter, the power adapter connected between the commercial power source and the external power interface, wherein the power adapter having an alternating current (AC) to direct current (DC) converting circuit, and the converting component is a direct current (DC) to direct current (DC) converting circuit, the regulator component is a voltage regulator circuit and the transformer component is a voltage transformer circuit.

3. The smart ultra box according to claim 2, wherein the direct current (DC) to direct current (DC) converting circuit is a boost circuit, a buck circuit, buck-boost circuit and/or a combination of one or more thereof.

4. The smart ultra box according to claim 1, wherein the converting component is an alternating current (AC) to direct current (DC) converting circuit, the regulator component is a voltage regulator circuit, and the transformer component is a voltage transformer circuit.

5. A protective case, adapted to accommodate a mobile communication device, the protective case comprising:
    an accommodating portion, to house the mobile communication device;
    a bottom plate portion, coupling with the accommodating portion; and
    a smart ultra box as claimed in claim 1 in which the ultra box disposes in an out side of the accommodating portion;
    wherein the flexible printed circuit board disposes in the bottom plate portion.

6. The protective case according to claim 5, wherein the bottom plate portion is an outer casing of the protective case, the flexible printed circuit board extends to a connecting portion from the outer casing, and a terminal of the flexible printed circuit board electrically connects to the connecting portion.

7. The protective case according to claim 6, wherein the connecting portion electrically connects to a mobile power supply device.

8. The protective case according to claim 5, wherein the main body of the ultra box and the accommodating portion is an integrated design, the power output interface disposes an inside of the accommodating portion, and the external power interface disposes in the out side of the accommodating portion.

* * * * *